United States Patent Office 3,107,980
Patented Oct. 22, 1963

3,107,980
CARBON BLACK PROCESS
Harvey M. Cole, Walpole, William G. Burbine, Whitman, Merrill E. Jordan, Walpole, and David L. Petterson, Wollaston, Mass., assignors to Cabot Corporation, Boston, Mass., a corporation of Delaware
No Drawing. Filed Dec. 18, 1961, Ser. No. 160,290
9 Claims. (Cl. 23—209.8)

This application relates to the production of carbon black and more specifically to an improved process for producing carbon black by thermally decomposing gaseous hydrocarbons.

This application is a continuation in part of U.S. Serial No. 73,207, filed December 2, 1960, and now abandoned.

The cost of producing carbon black from gaseous hydrocarbon fuels such as natural gas and butane has risen more or less steadily for the past two decades due to the ever rising cost of the fuels. Accordingly, the present invention which relates to substantially improving the yield of carbon black produced by the thermal decomposition of gaseous hydrocarbon fuels in the impingement or channel process hereafter referred to as the channel process constitutes a major break-through in the technology of carbon black production.

Accordingly, it is the principal object of the present invention to provide an improved process for producing carbon black from gaseous hydrocarbon fuels by the channel process.

It is another object of this invention to provide a process wherein substantially greater yields of carbon black are obtained in the channel process by the thermal decomposition of gaseous hydrocarbon fuels.

It is still another object of this invention to provide a process wherein substantially greater yields of carbon black are obtained in the channel process by the thermal decomposition of gaseous hydrocarbon fuels enriched with normally liquid hydrocarbons.

Other objects will in part be obvious and will in part appear hereinafter.

In accordance with the present invention, it was disfuels, prior to being utilized in the production of carbon black in the channel process, are reformed by being subjected to high temperatures for a short period of time (the higher the temperature utilized, the shorter being the time required), and are cooled substantially immediately thereafter to a temperature low enough to quench the reforming reaction and prevent further reaction therein until the carbon forming reaction zone is reached, the yield of carbon black produced therefrom is substantially greater i.e. up to about 200% higher, than when the same fuel is utilized unreformed.

This phenomenon is not completely understood but it is believed, and there is no intention to be bound by this explanation, that the preliminary reforming or preconditioning converts a portion of the gaseous hydrocarbon fuel to more unsaturated and/or higher molecular species, which upon thermal decomposition in a given process give higher yields of carbon black than the original material would have given in the same process.

Specifically it was discovered that significant increases in yield are obtained when the gaseous hydrocarbon fuel is subjected to temperatures of between about 950° C. and 1450° C. for periods ranging from about 0.05 second to about 1 second, the higher the temperature, the shorter being the time required within the above range.

In accordance with the present invention, however, it was also discovered that the conditions for reforming set forth above are generally critical. For example, at lower temperatures and/or shorter reaction periods than those specified above, sufficient reforming generally does not occur, whereas at higher temperatures and/or for longer periods of time than specified above, free carbon and/or "heavy fogs" comprising large quantities of high molecular weight aromatics are formed which have a tendency to deposit tar-like materials in lines and to plug up distributors and/or burner tips. Thus, it is normally necessary to cool the reformed fuel quickly to temperatures below about 750° C. substantially immediately after reforming has been accomplished in order to quench the reforming reaction and preferably to cool the reformed fuel to at least about 500° C. before it enters the "hot house" in order to prevent the formation of harmful tar-like components before the ultimate burner tip and the carbon forming flame is actually reached. The critical importance of the cooling procedure will be readily understood when it is considered that channel carbon black is normally produced in a "hot" house comprising several thousand very small burner tips which are fed by only a few feeder lines and an extensive distributor network and that accordingly the time lag between the reforming of the fuel and the actual burning of the fuel in the burner tips is normally substantial i.e. on the order of 25 seconds. Thus, lacking positive steps to accomplish cooling of the reformed fuel to arrest the reforming process at the desired point, cooling of the fuel by natural processes, i.e. radiation, convection, etc. occurs only very slowly. Also, the temperatures of the atmosphere inside the "hot" house range as high as about 310° C., and accordingly, if the reforming reaction in the fuel is not arrested completely before entering the "hot house," free carbon and/or "heavy fogs" are very likely to be formed therein. (Further details relative to the construction of the "hot house" and the general operation of the channel process are disclosed in U.S. 2,719,078).

The manner in which the reformed fuel is cooled is not generally critical providing that the reformed fuel is cooled substantially immediately i.e. in less than about 1 second to a temperature below about 750° C., and preferably is further cooled to at least about 500° C. before entering the "hot house." Thus, shock cooling apparatus such as large expansion chambers or finned tube heat exchangers are suitable for the purposes of the present invention.

In accordance with the present invention it has been discovered that it is generally desirable to carry out the reforming of the fuel in the absence of free oxygen since highest yields are in general achieved in this way. In some cases, however, small amounts, i.e. up to about 2% by weight of the gaseous hydrocarbon fuel, of oxygen can be tolerated and improvements in yield over unreformed fuels can be achieved, although the results achieved in the presence of oxygen do not approach the optimum obtainable in the absence of oxygen.

Reforming as set forth above, is of benefit to any gaseous hydrocarbon fuel such as natural gas, "City gas" (i.e. natural gas plus up to about 8% air), methane, propane, ethane and butanes or mixtures of these with each other or with other gaseous hydrocarbons such as ethylene, etc. In addition it was discovered that when a gaseous hydrocarbon fuel is reformed and then enriched with an atomized or vaporized normally liquid hydrocarbon medium such as xylene or #2 fuel oil, and subsequently thermally decomposed under free carbon producing conditions, higher yields are obtained. Moreover, it was discovered that when a gaseous hydrocarbon fuel is enriched with a normally liquid hydrocarbon medium, and the enriched fuel then exposed to reforming conditions and subsequently thermally decomposed, still higher yields are obtained. It was accordingly concluded that reforming benefits to some extent the normally liquid hydrocarbon enriching medium as well as the gaseous hydrocarbon fuel. In addition to those normally liquid hydrocarbon enriching media specifically mentioned above, any of the substances disclosed in U.S. 2,719,078 to C. Billings et al. as being suitable for practicing the invention described therein can be utilized in the practice of the present invention. Specifically xylene, #2 fuel oil, ethane and distillate fuels are suitable enriching media for the purposes of the present invention.

It should be pointed out that reforming is best accomplished in the absence of catalytic agents. For example, care should be exercised in containing the reforming reaction that the reaction zone not be bounded by catalytically active materials else cracking of the hydrocarbon fuel or portions thereof may occur. Carbon black, if formed at this stage, will tend to plug up lines, burner tips, etc., and will coat exposed surfaces. It has been found that refractory substances such as porcelain, quartz and glass as well as other materials such as metals when lined with said refractory substances are catalytically non-active and are therefore entirely suitable materials for enclosing the reaction zone wherein reforming is accomplished. In addition it has been found that certain metals, specifically copper, nickel and cobalt as well as other metals and materials lined with these metals are also suitable for confining the reforming reaction.

There follow a number of non-limiting illustrative examples. The apparatus utilized in all the examples was substantially identical except as otherwise indicated. The gaseous hydrocarbon fuel to be reformed was led into a one foot length of 15 mm. I.D. "Pyrex" glass tubing within which was centrally positioned a ⅜ in. I.D. coil, comprising No. 30 platinum wire which was heated as desired by being connected through a variable resistor to a 115–120 volt A.C. source. The gas flow rate was maintained at about 8 s.c.f.h. in all the examples, the contact time between the gas and the coil being varied by varying the length of the coil as is indicated in the examples. The outlet end of said glass tubing led into one neck of a 1000 cc. two neck flask which caused the reformed gas to expand immediately and thereby be cooled to temperatures well below 750° C. in substantially less than one second. From the flask, the reformed gas was fed directly into a 3 tip channel house, each tip of which had a slot width of about 18–20 mils and was capable of burning about 3 cubic feet of natural gas per hour. A channel member was suspended over said tips and means were provided for removing deposited carbon black from the channel member.

Example 1

"City" gas comprising by weight about 96% natural gas and about 4% air was introduced into the above-described system while a 6 inch coil giving a contact time of about 0.5 second was not heated and the system was at room temperature. Accordingly, reforming did not occur. The yield of carbon black was about 1.39 lbs. per thousand cubic feet of gas.

Example 2

"City" gas was introduced into the system while a 6-inch coil of platinum wire was heated to a reforming temperature of about 1175° C. The temperature of the gas one second after entering the cooling flask was about 100° C. The yield of carbon black was about 1.95 lbs. per thousand cubic feet of gas.

Example 3

This example was a duplicate of Example 1 except that there was atomized into the gas prior to the introduction of said gas into the system about 0.198 gallon per thousand cubic feet of gas of #2 fuel oil. The yield of carbon black was about 1.99 lbs. per thousand cubic feet of gas.

Example 4

This example was a duplicate of Example 2 except that after the gas had been subjected to the reforming conditions but before the gas was fed into the channel house there was atomized into the gas about 0.192 gallon per thousand cubic feet of gas of #2 fuel oil. The yield of carbon black was about 3.12 lbs. per thousand cubic feet of gas.

Example 5

This example was a duplicate of Example 2 except that prior to introducing the gas into the system, the gas was enriched by atomizing thereinto about 0.192 gallon per thousand cubic feet of gas of #2 fuel oil. The yield of carbon black was about 4.95 lbs. per thousand cubic feet of gas.

Example 6

This example is a duplicate of Example 2 except that the coil was heated to a temperature of only about 900° C. The temperature of the gas one second after entering the cooling flask was about 75° C. This gas yielded only about 1.99 lbs. of carbon black per thousand cubic feet of gas.

Example 7

In this example the coil was about 12 inches in length and was heated to a temperature of about 1350° C. The contact time was about 1 second. The temperature of the gas one second after entering the cooling flask was about 150° C. The yield of carbon black was about 2.58 lbs. per thousand cubic feet of gas. However, during the reforming operation, a dense fog formed which coated the lines and tips, etc.

Example 8

Ethane was introduced into the above-described system while a 6 inch coil giving a contact time of about 0.5 second was not heated and the system was at room temperature. Accordingly, reforming did not occur. The yield of carbon black was about 2.97 lbs. per thousand cubic feet of gas.

Example 9

This example was a duplicate of Example 8 except that in this example, the coil was heated to a temperature of about 1175° C. The temperature of the gas one second after entering the cooling flask was about 100° C. The yield of carbon black was about 10.3 lbs. per thousand cubic feet of gas.

Example 10

Natural gas was introduced into the above-described system while a 6 inch coil giving a contact time of about 0.5 second was not heated and the system was at room temperature. Accordingly, reforming did not occur. The yield of carbon black was about 1.59 lbs. per thousand cubic feet of gas.

Example 11

This example was a duplicate of Example 10 except that in this example the coil was heated to a temperature of about 1175° C. The temperature of the gas one second after entering the cooling flask was about 100° C. The yield of carbon black was about 4.66 lbs. per thousand cubic feet of gas.

Example 12

This example is a duplicate of Example 11 except that the reformed gas is not led into the cooling flask. Instead, the reformed gas is fed directly into the three tip channel house after a residence time in the lines of about two seconds. The yield of carbon black initially is about 4.66 lbs. per thousand cubic feet of gas but tip forking quickly occurs which not only causes the yield to decrease but is merely a forerunner of complete blocking of the burner tips which follows within a short time.

Obviously many changes may be made in the above-description and examples without departing from the scope of the invention. Accordingly, it is intended that the description and examples be regarded as illustrative and as in no way limiting the scope of the invention.

What we claim is:

1. An improved process for producing channel carbon black which comprises reforming a gaseous hydrocarbon fuel by subjecting it to temperatures between about 950° C. and 1450° C. for from about 0.05 to 1.0 second, the higher the temperature utilized, the shorter being the time required within the above range, substantially immediately cooling said fuel to a temperature below about 750° C. and, while maintaining its temperature below about 750° C., distributing said fuel to a multiplicity of small flames impinging upon a cooled surface under free carbon forming conditions.

2. The process of claim 1 wherein said gaseous hydrocarbon fuel is chosen from the group consisting of natural gas, natural gas-air mixtures comprising at least about 92% by weight natural gas, and natural gas-oxygen mixtures comprising by weight at least 98% natural gas.

3. The process of claim 1 wherein said gaseous hydrocarbon fuel is natural gas.

4. An improved process for producing channel carbon black which comprises reforming a gaseous hydrocarbon fuel by subjecting it to temperatures between about 950° C. and 1450° C. for from about 0.05 to 1.0 second in the absence of oxygen, the higher the temperature utilized, the shorter being the time required within the above range, substantially immediately cooling said fuel to a temperature below about 750° C. and further cooling said fuel to a temperature below about 500° C., and while maintaining the temperature below about 500° C. distributing said fuel to a multiplicity of small flames impinging upon a cooled surface under free carbon forming conditions.

5. The process of claim 4 wherein said gaseous hydrocarbon fuel is natural gas.

6. An improved process for producing channel carbon black which comprises reforming a gaseous hydrocarbon fuel by subjecting it to temperatures between about 950° C. and 1450° C. for from about 0.05 to 1.0 second, the higher the temperature utilized, the shorter being the time required within the above range, substantially immediately cooling said fuel to a temperature below about 750° C., and further cooling said fuel to a temperature below about 500° C., and while maintaining the temperature below about 500° C. introducing into said reformed fuel a normally liquid hydrocarbon, and distributing the resulting mixture to a multiplicity of small flames impinging upon a cooled surface under free carbon forming conditions.

7. An improved process for producing channel carbon black which comprises enriching a gaseous hydrocarbon fuel by introducing thereinto a normally liquid hydrocarbon and reforming the resulting mixture by subjecting said mixture to temperatures between about 950° C. and 1450° C. for from about 0.05 to 1.0 second, the higher the temperature utilized, the shorter being the time required within the above range, substantially immediately cooling said mixture to a temperature below about 750° C., and further cooling said mixture to a temperature below about 500° C., and while maintaining the temperature below about 500° C. distributing said mixture to a multiplicity of small flames impinging upon a cooled surface under free carbon forming conditions.

8. An improved process for producing channel carbon black which comprises enriching a gaseous hydrocarbon fuel by introducing thereinto a normally liquid hydrocarbon, subjecting the resulting mixture in the absence of oxygen, to temperatures between about 950° C. and 1450° C. for from about 0.05 to 1.0 second, the higher the temperature utilized, the shorter being the time required within the above range, substantially immediately cooling said mixture to a temperature below about 750° C. and further cooling said mixture to a temperature below about 500° C., and while maintaining its temperature below about 500° C. distributing said mixture to a multiplicity of small flames impinging upon a cooled surface under free carbon forming conditions.

9. An improved process for producing channel carbon black which comprises reforming a gaseous hydrocarbon fuel by subjecting it to temperatures between about 950° C. and 1450° C. for from about 0.05 to 1.0 second, the higher the temperature utilized, the shorter being the time required within the above range, substantially immediately cooling the reformed fuel to a temperature between about 750° C. and about 500° C., introducing into said reformed fuel a normally liquid hydrocarbon, and cooling the resulting mixture to a temperature below about 500° C., and while maintaining the tempeature below about 500° C., distributing said mixture to a multiplicity of small flames impinging upon a cooled surface under free carbon forming conditions.

References Cited in the file of this patent
UNITED STATES PATENTS

| | | |
|---|---|---|
| 1,860,598 | Rumbarger | May 31, 1932 |
| 2,556,196 | Krejci | June 12, 1951 |
| 2,719,078 | Billings et al. | Sept. 27, 1955 |

UNITED STATES PATENT OFFICE
CERTIFICATE OF CORRECTION

Patent No. 3,107,980                                    October 22, 1963

Harvey M. Cole et al.

It is hereby certified that error appears in the above numbered patent requiring correction and that the said Letters Patent should read as corrected below.

Column 1, line 41, after "dis-" insert -- covered, surprisingly, that when gaseous hydrocarbon --.

Signed and sealed this 8th day of September 1964.

(SEAL)
Attest:

ERNEST W. SWIDER
Attesting Officer

EDWARD J. BRENNER
Commissioner of Patents